US012749617B2

(12) United States Patent
Dwari et al.

(10) Patent No.: US 12,749,617 B2
(45) Date of Patent: Sep. 29, 2026

(54) RADIATION HARDENED ACTIVE POWER TRANSFORMER

(71) Applicant: Rockwell Collins, Inc., Cedar Rapids, IA (US)

(72) Inventors: Suman Dwari, Vernon, CT (US); Michael A. Futrell, Rockford, IL (US); Baljit Riar, East Hartford, CT (US); Parikshith Channegowda, Marlborough, CT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 232 days.

(21) Appl. No.: 18/431,463

(22) Filed: Feb. 2, 2024

(65) Prior Publication Data

US 2025/0253094 A1 Aug. 7, 2025

(51) Int. Cl.

| | |
|---|---|
| ***H01F 27/42*** | (2006.01) |
| ***H01F 27/24*** | (2006.01) |
| ***H01F 27/29*** | (2006.01) |
| ***H01F 27/30*** | (2006.01) |
| ***H02M 1/42*** | (2007.01) |
| ***H02M 5/10*** | (2006.01) |
| ***H02M 7/537*** | (2006.01) |
| *H02M 7/48* | (2007.01) |

(52) U.S. Cl.

CPC ............. *H01F 27/42* (2013.01); *H01F 27/24* (2013.01); *H01F 27/29* (2013.01); *H01F 27/303* (2013.01); *H02M 1/4208* (2013.01); *H02M 5/10* (2013.01); *H02M 7/537* (2013.01); *H02M 1/4283* (2021.05); *H02M 7/4807* (2013.01)

(58) Field of Classification Search

CPC .......... H01F 27/42; H01F 27/24; H01F 27/29; H01F 27/303; H02M 7/537; H02M 1/4283; H02M 7/4807; H02M 5/10; H02M 1/4208

See application file for complete search history.

(56) References Cited

U.S. PATENT DOCUMENTS

| | | | |
|---|---|---|---|
| 9,473,013 | B2 | 10/2016 | Singh et al. |
| 9,768,704 | B2 | 9/2017 | Haj-Maharsi et al. |
| 9,843,270 | B2 | 12/2017 | Dwari et al. |

(Continued)

FOREIGN PATENT DOCUMENTS

| | | |
|---|---|---|
| IN | 335256 B | 1/2014 |
| WO | 2023241074 A1 | 12/2023 |

OTHER PUBLICATIONS

Oleson, Steven et al. A Deployable 40 kWe Lunar Fission Surface Power Concept. From the Nuclear and Emerging Technologies for Space Conference (Mar. 22, 2022). NETS 38629. Available at: https://ntrs.nasa.gov/api/citations/20220004670/downloads/40%20kW%20Deployable%20FSP%20Paper_FINAL.pdf.

(Continued)

*Primary Examiner* — Crystal L Hammond
*Assistant Examiner* — Jonathan Walter Soileau
(74) *Attorney, Agent, or Firm* — Suiter Swantz IP

(57) ABSTRACT

A radiation hardened active power transformer includes an active compensator on a primary side of a transformer. The transformer steps up an input voltage to an output voltage. The active compensator controls a reactive power of the output voltage. The active compensator includes wide band-gap transistors which radiation harden the active compensator to resist ionizing radiation.

19 Claims, 10 Drawing Sheets

100

(56) References Cited

U.S. PATENT DOCUMENTS

| | | | |
|---|---|---|---|
| 10,032,553 | B2 | 7/2018 | Zeng et al. |
| 10,050,548 | B2 | 8/2018 | Huang et al. |
| 10,686,376 | B1 | 6/2020 | Guo et al. |
| 10,742,127 | B2 | 8/2020 | Riar et al. |
| 10,924,026 | B2 | 2/2021 | Zargari et al. |
| 11,424,692 | B2 | 8/2022 | Dwari et al. |
| 11,451,091 | B2 | 9/2022 | Thrimawithana et al. |
| 11,532,993 | B1 | 12/2022 | Dwari et al. |
| 11,626,811 | B2 | 4/2023 | Riar et al. |
| 11,728,738 | B2 | 8/2023 | Riar et al. |
| 11,770,066 | B2 | 9/2023 | Liu et al. |
| 2004/0207266 | A1* | 10/2004 | Abel ........................ H02J 9/066 307/80 |
| 2006/0120109 | A1* | 6/2006 | Inoue ................. H05B 41/2821 362/614 |
| 2010/0201338 | A1 | 8/2010 | Haj-Maharsi et al. |
| 2010/0220499 | A1* | 9/2010 | Haj-Maharsi ....... H02M 1/4233 363/13 |
| 2015/0288287 | A1 | 10/2015 | Madawala et al. |
| 2015/0365003 | A1* | 12/2015 | Sadwick ................. H02M 3/28 363/21.01 |
| 2016/0308462 | A1 | 10/2016 | Hou |
| 2021/0135595 | A1 | 5/2021 | Chen et al. |
| 2022/0271646 | A1 | 8/2022 | Lu et al. |
| 2022/0294357 | A1 | 9/2022 | Channegowda et al. |
| 2022/0385205 | A1 | 12/2022 | Lee et al. |
| 2023/0062548 | A1 | 3/2023 | Channegowda et al. |
| 2023/0283165 | A1 | 9/2023 | Fang et al. |
| 2023/0420930 | A1* | 12/2023 | Ishikawa ................ H02H 7/122 |

OTHER PUBLICATIONS

White, Charles. Advancing Clean Electric Power Technologies—Technology Assessments. From the National Energy Technology Laboratory, chapter 4 of the 2015 Quadrennial Technology Review (Jun. 29, 2016). OSTI Identifier 1505083 Available at: https://www.netl.doe.gov/projects/files/2015QTRChap4AdvancingCleanElectricPowerTechnologiesSCO2BraytonCycle_062916.pdf.

European Patent Office, Extended European Search Report received in EP Application No. 25155527.2, Jun. 25, 2025, 10 pages.

Wikipedia, "Gallium Nitride," Jan. 15, 2024, 12 pages.

* cited by examiner

104

104

104

104

300

300

300

100

RADIATION HARDENED ACTIVE POWER TRANSFORMER

TECHNICAL FIELD

The present invention generally relates to conversion of AC power input into AC power output, and more specifically to converting using transformers.

BACKGROUND

Nuclear based electric power generators offer capabilities for providing space power, such as for lunar power distribution system. However, such generators may have soft source type characteristics that are not suitable for relatively longer distance (e.g., kilometers) of power distribution. The key limitation of such generators are (i) lower reactive power capability, (ii) lower stability margin and hence can support only lighter disturbance, and (iii) low output voltage not suitable for longer distance power transmission.

Transformer based alternating current (AC) distribution systems can be used to step-up the voltage level of the generators to a higher voltage level for transmission of power over longer distances. Such arrangement of distribution systems suffer from major limitations, including, limited reactive power capability, limited harmonics supporting capability, large voltage swing, and instability. Therefore, it would be advantageous to provide a device, system, and method that cures the shortcomings described above.

SUMMARY

In some aspects, the techniques described herein relate to a radiation hardened active power transformer including: a multi-port transformer including a primary winding, a secondary winding, and a tertiary winding; wherein the primary winding receives an input AC voltage; wherein the secondary winding is configured to step up the input AC voltage to an output AC voltage; wherein the tertiary winding is configured to step down the output AC voltage to a reactive AC voltage; an active compensator including a plurality of capacitors and a plurality of wide band-gap transistors; wherein the active compensator is connected to the tertiary winding; wherein the active compensator is configured to control the reactive AC voltage across the tertiary winding using the plurality of wide band-gap transistors; and a controller; wherein the controller is configured to control the plurality of wide band-gap transistors using pulse width modulation.

In some aspects, the techniques described herein relate to a radiation hardened active power transformer, the multi-port transformer including a core; wherein the primary winding, the secondary winding, and the tertiary winding are wound around the core.

In some aspects, the techniques described herein relate to a radiation hardened active power transformer, wherein the output AC voltage is at least one order of magnitude larger than the input AC voltage; wherein the output AC voltage is at least one order of magnitude larger than the reactive AC voltage.

In some aspects, the techniques described herein relate to a radiation hardened active power transformer, wherein a frequency of the input AC voltage and the output AC voltage is between 60 and 1000 Hz; wherein the controller is configured to control a switching frequency of the plurality of wide band-gap transistors; wherein the switching frequency is at least one order of magnitude higher than the frequency of the input AC voltage.

In some aspects, the techniques described herein relate to a radiation hardened active power transformer, wherein the input AC voltage and the output AC voltage are single-phase; wherein the multi-port transformer is a single-phase transformer.

In some aspects, the techniques described herein relate to a radiation hardened active power transformer, wherein the input AC voltage and the output AC voltage are three-phase; wherein the multi-port transformer is a three-phase transformer.

In some aspects, the techniques described herein relate to a radiation hardened active power transformer, wherein a capacitive voltage of the plurality of capacitors is charged from the reactive AC voltage; wherein the reactive AC voltage does not include real power.

In some aspects, the techniques described herein relate to a radiation hardened active power transformer, wherein a band-gap of the plurality of wide band-gap transistors is between 2 and 4 eV; wherein the plurality of wide band-gap transistors include a semiconductor material.

In some aspects, the techniques described herein relate to a radiation hardened active power transformer, wherein the semiconductor material is gallium nitride.

In some aspects, the techniques described herein relate to a radiation hardened active power transformer, wherein the plurality of capacitors are a pair of shunt capacitors which are switched by the plurality of wide band-gap transistors.

In some aspects, the techniques described herein relate to a radiation hardened active power transformer, wherein the active compensator includes a DC-to-AC converter circuit with the pair of shunt capacitors and the plurality of wide band-gap transistors.

In some aspects, the techniques described herein relate to a radiation hardened active power transformer, wherein the DC-to-AC converter circuit is one of a two-level half bridge, a two-level full bridge, a three-level half bridge, a three-level full bridge, a five-level half-bridge, a five-level full bridge, or flying capacitor based five-level converter.

In some aspects, the techniques described herein relate to a radiation hardened active power transformer, wherein the reactive AC voltage is derated below a maximum operational voltage of the plurality of wide band-gap transistors.

In some aspects, the techniques described herein relate to a radiation hardened active power transformer, including one or more primary-side sensors configured to sense one or more primary-side parameters of the input AC voltage; wherein the controller is configured to receive the one or more primary-side parameters and control the plurality of wide band-gap transistors based on the one or more primary-side parameters.

In some aspects, the techniques described herein relate to a radiation hardened active power transformer, including one or more secondary-side sensors configured to sense one or more secondary-side parameters of the output AC voltage; wherein the controller is configured to receive the one or more secondary-side parameters and control the plurality of wide band-gap transistors based on the one or more secondary-side parameters.

In some aspects, the techniques described herein relate to a radiation hardened active power transformer, including a circuit breaker; wherein the circuit breaker is configured to receive the output AC voltage from the secondary winding; wherein the controller is configured to reset the circuit breaker subsequent to the circuit breaker breaking a circuit leading from the secondary winding.

In some aspects, the techniques described herein relate to a radiation hardened active power transformer, wherein the multi-port transformer includes a plurality of primary windings configured to receive a plurality of input AC voltages; wherein the secondary winding is configured to step up the plurality of input AC voltages to the output AC voltage.

In some aspects, the techniques described herein relate to a radiation hardened active power transformer, including a plurality of active compensators.

In some aspects, the techniques described herein relate to a power distribution system including: A radiation hardened active power transformer including: a multi-port transformer including a primary winding, a secondary winding, and a tertiary winding; wherein the primary winding receives an input AC voltage; wherein the secondary winding is configured to step up the input AC voltage to an output AC voltage; wherein the tertiary winding is configured to step down the output AC voltage to a reactive AC voltage; an active compensator including a plurality of capacitors and a plurality of wide band-gap transistors; wherein the active compensator is connected to the tertiary winding; wherein the active compensator is configured to control the reactive AC voltage across the tertiary winding using the plurality of wide band-gap transistors; and a controller; wherein the controller is configured to control the plurality of wide band-gap transistors using pulse width modulation; a power generator configured to generate the input AC voltage; and a transmission line; wherein the radiation hardened active power transformer interfaces the power generator with the transmission line; wherein the transmission line transmits the output AC voltage.

In some aspects, the techniques described herein relate to a power distribution system, wherein the power generator includes one of a nuclear-based Brayton-cycle generator or a nuclear-based Stirling-Cycle generator.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
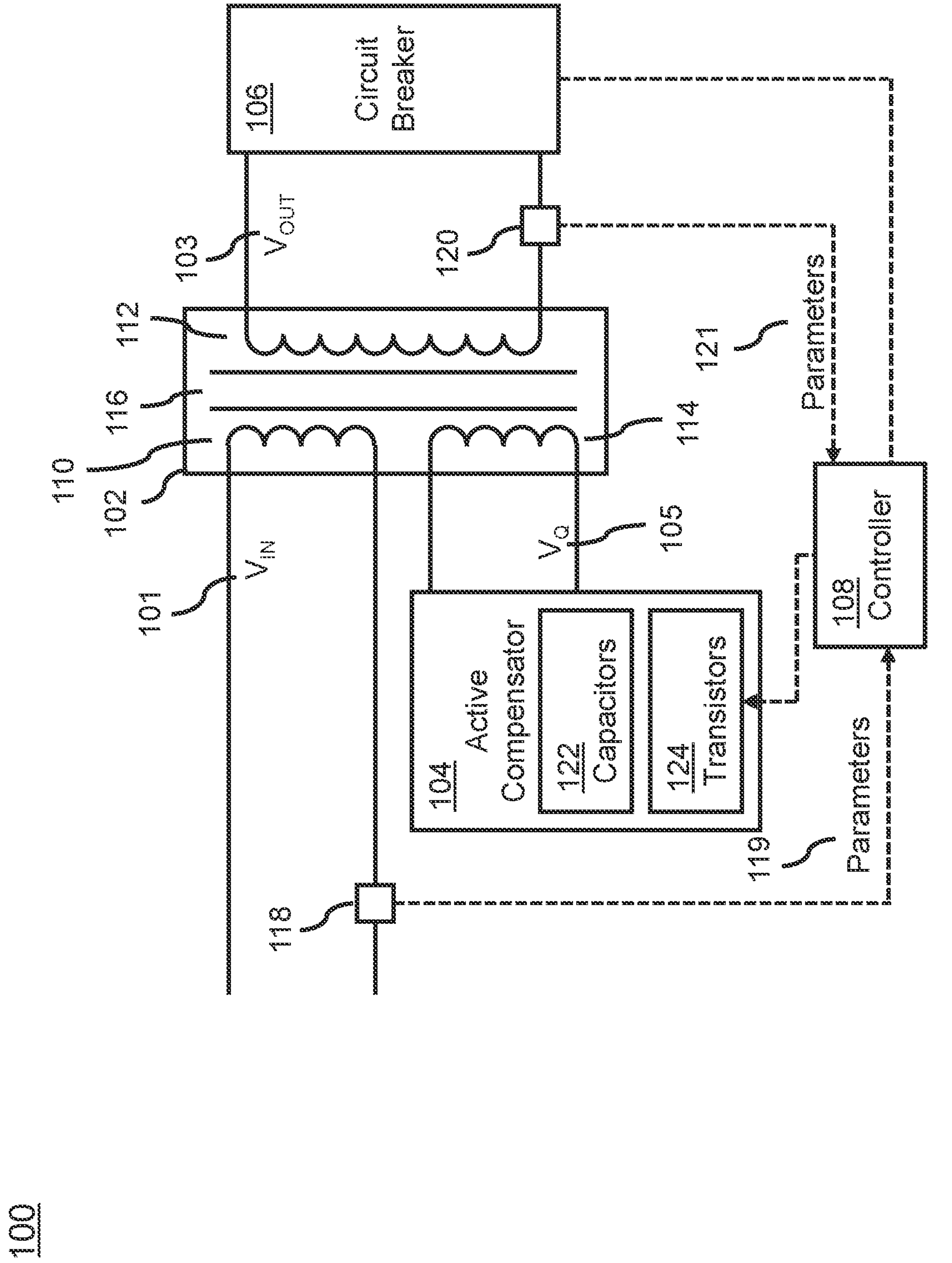
FIG. 1 depicts a radiation hardened active power transformer, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of “a” or “an” may be employed to describe elements and components of embodiments disclosed herein. This is done merely for convenience and “a” and “an” are intended to include “one” or “at least one,” and the singular also includes the plural unless it is obvious that it is meant otherwise.

Finally, as used herein any reference to “one embodiment” or “some embodiments” means that a particular element, feature, structure, or characteristic described in connection with the embodiment is included in at least one embodiment disclosed herein. The appearances of the phrase “in some embodiments” in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

U.S. Pat. No. 11,532,993B1, titled "AC-to-AC power supplies using multi-frequency power conversion building blocks"; U.S. Pat. No. 11,424,692B2, titled "Multi-level single-phase AC-to-DC converter"; U.S. Pat. No. 9,768,704B2, titled "Hybrid distribution transformer having a power electronic module for controlling input power factor and output voltage"; U.S. Pat. No. 11,626,811B2, titled "Multi-level modular converter"; U.S. Pat. No. 11,451,091B2, titled "Converter"; are incorporated herein by reference in the entirety.

Reference will now be made in detail to the subject matter disclosed, which is illustrated in the accompanying drawings. Embodiments of the present disclosure are generally directed to a radiation hardened active power transformer 100. The radiation hardened active power transformer 100 includes an active compensator on a primary side of a transformer. The transformer steps up an input voltage to an output voltage. The active compensator controls a reactive power of the output voltage. The active compensator includes wide band-gap transistors which radiation harden the active compensator to resist ionizing radiation.

Referring now to FIG. 1, a radiation hardened active power transformer 100 is described, in accordance with one or more embodiments of the present disclosure. The radiation hardened active power transformer 100 may include a multi-port transformer 102, active compensator 104, circuit breaker 106, controller 108, primary-side sensors 118, secondary-side sensors 120, and the like.

The radiation hardened active power transformer 100 may include the multi-port transformer 102. The multi-port transformer 102 may be a step-up transformer with power factor correction. The multi-port transformer 102 may include one or more primary windings 110, one or more secondary windings 112, one or more tertiary windings 114, core 116, and the like.

The multi-port transformer 102 may include the primary windings 110. The primary windings 110 may receive an input AC voltage 101. The primary windings 110 may be considered "primary" in that the input AC voltage 101 may be received from a power source.

The multi-port transformer 102 may include the secondary windings 112. The secondary windings 112 may be configured to step up the input AC voltage 101 from the primary windings 110 to an output AC voltage 103. The secondary windings 112 may be configured to step up the input AC voltage 101 from the primary windings 110 to the output AC voltage 103 without intermediate conversion into a direct current (DC) voltage. The secondary windings 112 may be considered "secondary" in that the output AC voltage 103 may be output to a load.

The input AC voltage 101 may be between 100 and 999 V (e.g., on the range of several hundred volts). For example, the input AC voltage 101 may be between 100 and 600 V. For instance, the input AC voltage 101 may be 220 V. The output AC voltage 103 may be higher than the input AC voltage 101. For example, the input AC voltage 101 may be between 1 and 20 kV (e.g., 3.3 kV). In embodiments, the output AC voltage 103 may be at least one order of magnitude larger than the input AC voltage 101. The output AC voltage 103 may be based on the input AC voltage 101 and a turn ratio of the primary windings 110 to the secondary windings 112. The input AC voltage 101 and the output AC voltage 103 may have a frequency. For example, the frequency may be between 60 and 1000 Hz (e.g., 60 Hz, 400 Hz, 800 Hz, 1000 Hz). For instance, the frequency may be from 300 Hz to 750 Hz.

The input AC voltage 101 and the output AC voltage 103 may each include real power components and/or reactive power components. For example, the output AC voltage 103 may undesirably include reactive power components induced by a reactive load.

The input AC voltage 101 and the output AC voltage 103 may each include a phase, such as single-phase, two-phase, three-phase, or multi-phase. Similarly, the multi-port transformer 102 may be a single-phase transformer, a two-phase transformer, a three-phase transformer, or a multi-phase transformer. The multi-port transformer 102 may include one of the primary windings 110 for each phase of the input AC voltage 101 and one of the secondary windings 112 for each phase of the output AC voltage 103. For example, the multi-port transformer 102 may be a single-phase transformer, a two-phase transformer, a three-phase transformer, or a multi-phase transformer. Where the multi-port transformer 102 is a three-phase transformer, the primary windings 110 and the secondary windings 112 may include a wye-delta configuration, a wye-wye configuration, a delta-wye configuration, or a delta-delta configuration.

The multi-port transformer 102 may include the tertiary windings 114. The tertiary windings 114 may receive a reactive AC voltage 105. The tertiary windings 114 may be configured to step down the output AC voltage 103 from the secondary windings 112 to the reactive AC voltage 105. The tertiary windings 114 may be considered "tertiary" in that the tertiary windings 114 and the reactive AC voltage 105 are not coupled to the power source or the load. The reactive AC voltage 105 may be lower than the output AC voltage 103. For example, the reactive AC voltage 105 may be 600 V or below. In embodiments, the output AC voltage 103 may be at least one order of magnitude larger than the reactive AC voltage 105. The reactive AC voltage 105 may be based on the output AC voltage 103 and a turn ratio of the tertiary windings 114 to the secondary windings 112. In embodiments, the reactive AC voltage 105 may be at the same voltage as the input AC voltage 101. The output AC voltage 103 can support large reactive loads and/or non-linear load caused by the output AC voltage 103.

The active compensator 104 may include one or more of the tertiary windings 114. For a three-phase system, the active compensator 104 may have two of the tertiary windings 114. For example, the two of the tertiary windings 114 may provide quadrature control.

The multi-port transformer 102 may include the core 116. The primary windings 110, the secondary windings 112, and the tertiary windings 114 may be wound around the core 116.

The radiation hardened active power transformer 100 may include the active compensator 104. The active compensator 104 may be connected to the tertiary winding 114. The active compensator 104 is configured to control the reactive AC voltage 105 across the tertiary winding 114 using the wide band-gap transistors 124. The active compensator 104 control the reactive AC voltage 105 to reduce a reactive power and/or harmonic power in the output AC voltage 103. For example, the active compensator 104 may inject the reactive AC voltage 105 into the output AC voltage 103 via the tertiary windings 114 and the secondary windings 112. The harmonic and the reactive power can be compensated by the active compensator 104 to improve an instantaneous balance of power and/or voltage stability of the output AC voltage 103. Thus, the active compensator 104 may correct the power factor of the output AC voltage 103. Correcting the power factor may be desirable to ensure the input AC voltage 101 is stable. If there is a mismatch between the voltages, the active compensator may boost or bring down the voltage, appropriately.

The active compensator 104 may include capacitors 122. The capacitors 122 may be considered a DC side of the active compensator 104. The active compensator 104 may not include any power source. Instead, a capacitive voltage in the capacitors 122 may be charged from the reactive AC voltage 105. The reactive AC voltage 105 may not include any real power (e.g., active power). Instead, the reactive AC voltage 105 include a reactive power (e.g., capacitive, inductive, or a harmonic of the real power). The capacitors 122 may be shunt capacitors.

The active compensator 104 may include wide band-gap transistors 124. The wide band-gap transistors 124 may include a wide band-gap. For example, the wide band-gap may be between 2 and 4 eV. The wide band-gap may cause the wide band-gap transistors 124, the active compensator 104, and the radiation hardened active power transformer 100 to be radiation hardened. For example, the wide band-gap may prevent filling the conduction band of the wide band-gap transistors 124 when subject to charged particles (e.g., charged particles from the radiation belts or cosmic rays). The wide band-gap transistors 124 may include a semiconductor material, such as, but not limited to gallium nitride (GaN) or silicon carbide (SiC). In this regard, the wide band-gap transistors 124 may be GaN transistors, SiC transistors, and the like. The GaN transistors may include a band-gap of 3.44 eV. The SiC transistors may include a band-gap between 2.3 and 3.3 eV. It is contemplated that the GaN transistors may be desirable for the switching frequency and voltage characteristics.

The wide band-gap transistors 124 may include a structure such as, but not limited to, N-Channel metal-oxide-semiconductor FETs (MOSFETs). For example, the wide band-gap transistors 124 may be enhancement-mode N-Channel MOSFETs. It is further contemplated that the wide band-gap transistors 124 may be depletion-mode N-Channel MOSFETs, or the like. In embodiments, the wide band-gap transistors 124 may be high electron mobility transistors (HEMTs), also known as heterostructure field effect transistors (HFETs) or modulation-doped field effect transistors (MODFETs). The HEMTs may be field-effect transistors that include a junction between two materials with different band gaps (i.e., a heterojunction) as the channel instead of a doped region (as is generally the case for a MOSFET). In some embodiments, the wide band-gap transistors 124 may be GaN HEMTs.

The capacitors 122 may be shunt capacitors which are switched by the wide band-gap transistors 124. For example, the capacitors 122 may be a pair of the shunt capacitors which are switched by the wide band-gap transistors 124. The active compensator 104 may include a DC-to-AC converter circuit with the pair of shunt capacitors and the wide band-gap transistors 124. The DC-to-AC converter circuit may include a static Var compensator (SVC), a static synchronous compensator (STATCOM), or the like. For example, the DC-to-AC converter circuit may include a two-level half bridge, two-level full bridge, three-level half bridge, three-level full bridge, five-level half-bridge, five-level full bridge, flying capacitor based five-level converter, or the like. Each of such DC-to-AC converter circuits may include the capacitors 122 and the wide band-gap transistors 124. The wide band-gap transistors 124 may be utilized to realize a high density and high efficiency operation while also realizing a radiation tolerant solution.

The complexity of the DC-to-AC converter circuit may increase with additional of the wide band-gap transistors 124. Increasing the complexity may allow the reactive AC voltage 105 to approximate a sinusoid more closely. For example, the reactive AC voltage 105 may have a better voltage quality. For example, the quality of the reactive AC voltage 105 generated by the two-level half bridge and two-level full bridge may be lower than for the three-level half bridge, three-level full bridge, five-level half-bridge, five-level full bridge, and/or flying capacitor based five-level converter.

The active compensator 104 may be radiation hardened. For radiation tolerant design derating of the device maximum operation voltage is used as one of the potential approaches, which is very suitable for the active compensator 104. The reactive AC voltage 105 may be derated below a maximum operational voltage of the wide band-gap transistors 124. For example, the maximum operational voltage of the wide band-gap transistors 124 may be 1 kV, but the reactive AC voltage 105 may be derated to 600 V or below. The voltage level of the reactive AC voltage 105 may be on the lower side of the voltages for which the GaN FETs are capable.

The radiation hardened active power transformer 100 may include the controller 108. The controller 108 may be a digital controller, a signal level controller, a pulse width modulation (PWM) controller, or the like.

The controller 108 may control the active compensator 104 using pulse width modulation. In particular, the controller 108 may control the wide band-gap transistors 124 using PWM. For example, the wide band-gap transistors 124 may be controlled using pulses (e.g., on/off pulses) with a duty cycle. The active compensator 104 may be considered "active" by including the ability to control the wide band-gap transistors 124.

The controller 108 may control the switching frequency and duty cycle of the wide band-gap transistors 124. In embodiments, the controller 108 may switch the wide band-gap transistors 124 with a switching frequency between 10 to 1000 KHz. The switching frequency of the wide band-gap transistors 124 may be at least one order of magnitude higher than the frequency of the input AC voltage 101. The wide band-gap transistors 124 may switch at much higher frequency with significantly lower losses than silicon switching losses. The controller 108 may control the switching frequency depending on the target voltage and target converted frequency of a particular application.

In embodiments, the controller 108 may cause the active compensator 104 to control the reactive AC voltage 105. For example, the controller 108 may control the wide band-gap transistors 124 causing the active compensator 104 to control the reactive AC voltage 105 such that output AC voltage 103 is in phase with the input AC voltage 101. Thus, the controller 108 may cause the active compensator 104 to control the reactive AC voltage 105 to remove one or more reactive or harmonic components from the output AC voltage 103.

The radiation hardened active power transformer 100 may include the primary-side sensors 118 and/or the secondary-side sensors 120. The primary-side sensors 118 and/or the secondary-side sensors 120 may be implemented in one or more ways, such as windings embedded in the multi-port transformer 102, voltage sensors, current sensors, frequency sensors, phase sensors, and the like. The primary-side sensors 118 and the secondary-side sensors 120 may sense one or more primary-side parameters 119 of the input AC voltage 101 and one or more secondary-side parameters 121 of the output AC voltage 103, respectively. The one or more primary-side parameters 119 and the one or more secondary-side parameters 121 may include a voltage, current, frequency, and/or phase. Thus, voltage, current, frequency, and/or phase of the input AC voltage 101 and/or the output AC voltage 103 may be sensed and fed to the controller 108.

The controller 108 may receive the primary-side parameters 119 from the primary-side sensors 118 and/or the secondary-side parameters 121 from the secondary-side sensors 120. The controller 108 may control the active compensator 104 based on the primary-side parameters 119 and/or the secondary-side parameters 121. For example, the controller 108 may control the wide band-gap transistors 124 based on the primary-side parameters 119 and/or the secondary-side parameters 121. The controller 108 may use the primary-side parameters 119 and/or the secondary-side parameters 121 as feedback and/or feedforward information.

The radiation hardened active power transformer 100 may include the circuit breaker 106. The circuit breaker 106 may be coupled to the secondary windings 112. For example, the circuit breaker 106 may receive the output AC voltage 103 from the secondary windings 112. The circuit breaker 106 may be configured to break the circuit leading from the secondary windings 112. For example, the circuit breaker 106 may break the circuit leading from the secondary windings 112 when the output AC voltage 103 is disposed outside of a threshold voltage, a current exceeds a maximum current, or the like.

The controller 108 may be coupled to the circuit breaker 106. The controller 108 may perform fault management of the controller 108. For example, the controller 108 may clear a fault in the circuit breaker 106. For instance, the controller 108 may reset the circuit breaker 106 subsequent to the circuit breaker 106 breaking the circuit leading from the secondary windings 112.

Figure 2A:
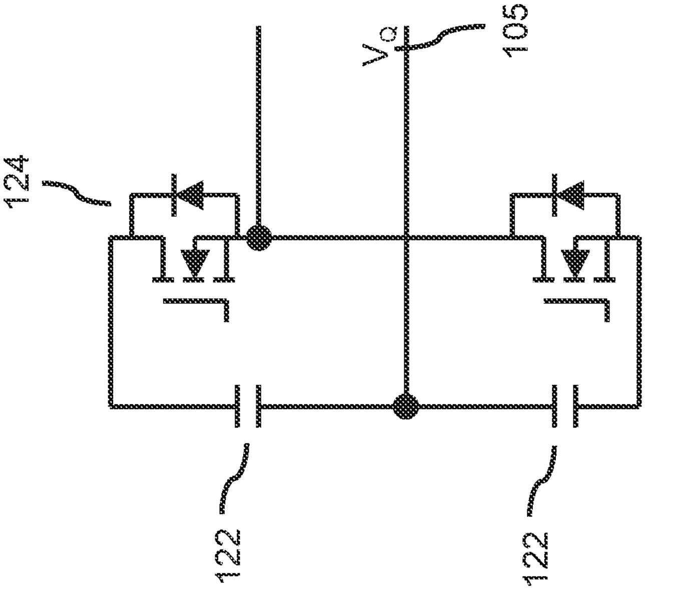
FIG. 2A depicts a schematic circuit diagram of an active compensator where the active compensator is a two-level Half-bridge, in accordance with one or more embodiments of the present disclosure.
Figure 2B:
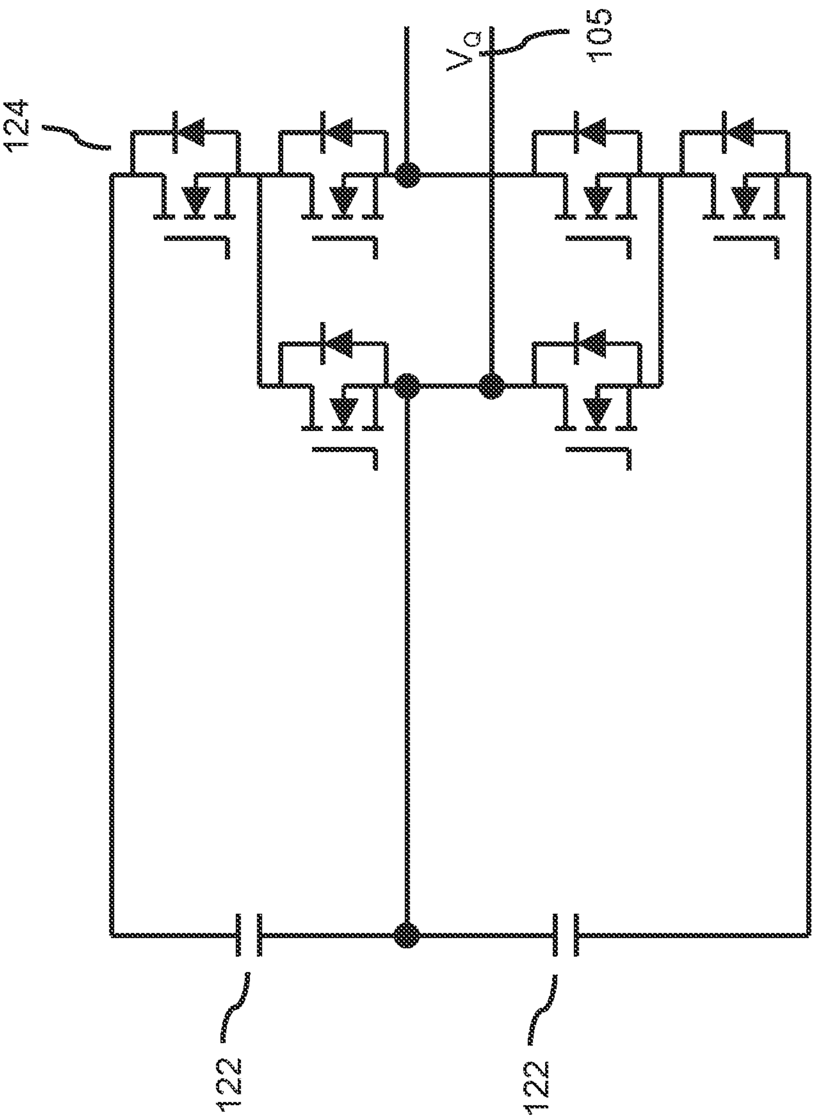
FIG. 2B depicts a schematic circuit diagram of an active compensator where the active compensator is a three-level half bridge, in accordance with one or more embodiments of the present disclosure.
Figure 2C:
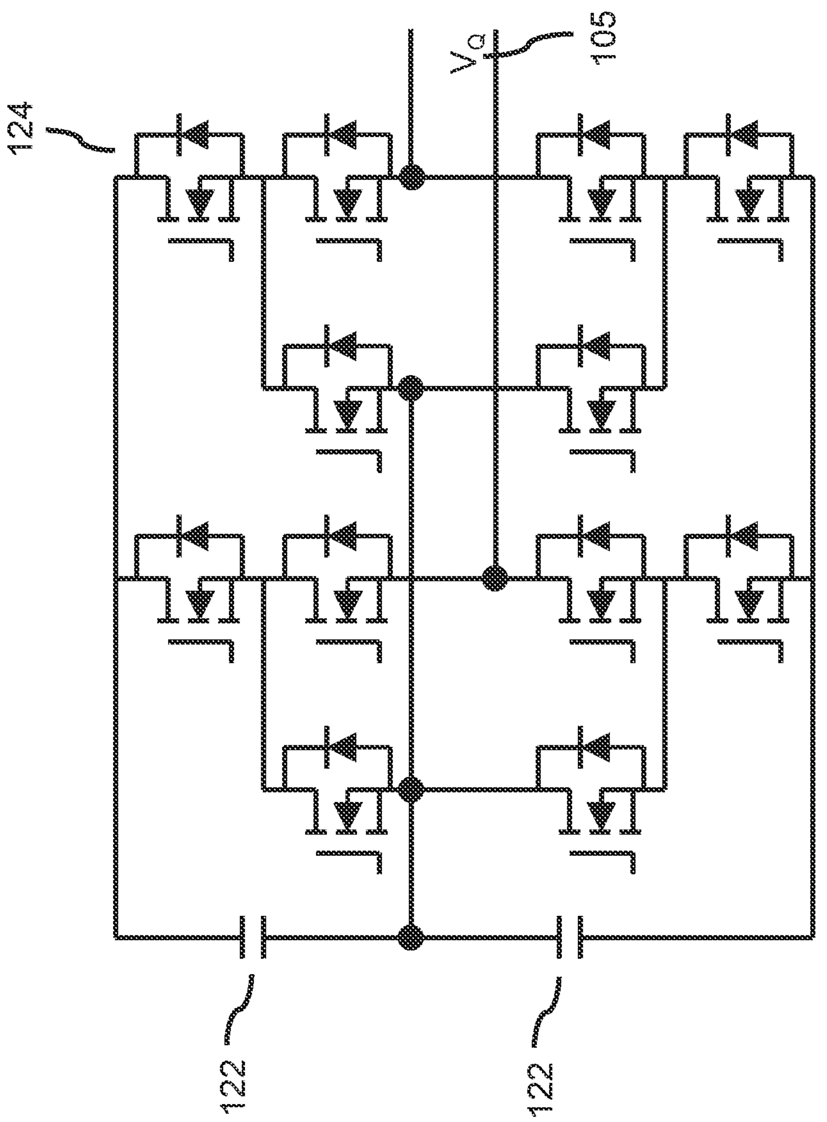
FIG. 2C depicts a schematic circuit diagram of an active compensator where the active compensator is a three-level full bridge, in accordance with one or more embodiments of the present disclosure.
Figure 2D:
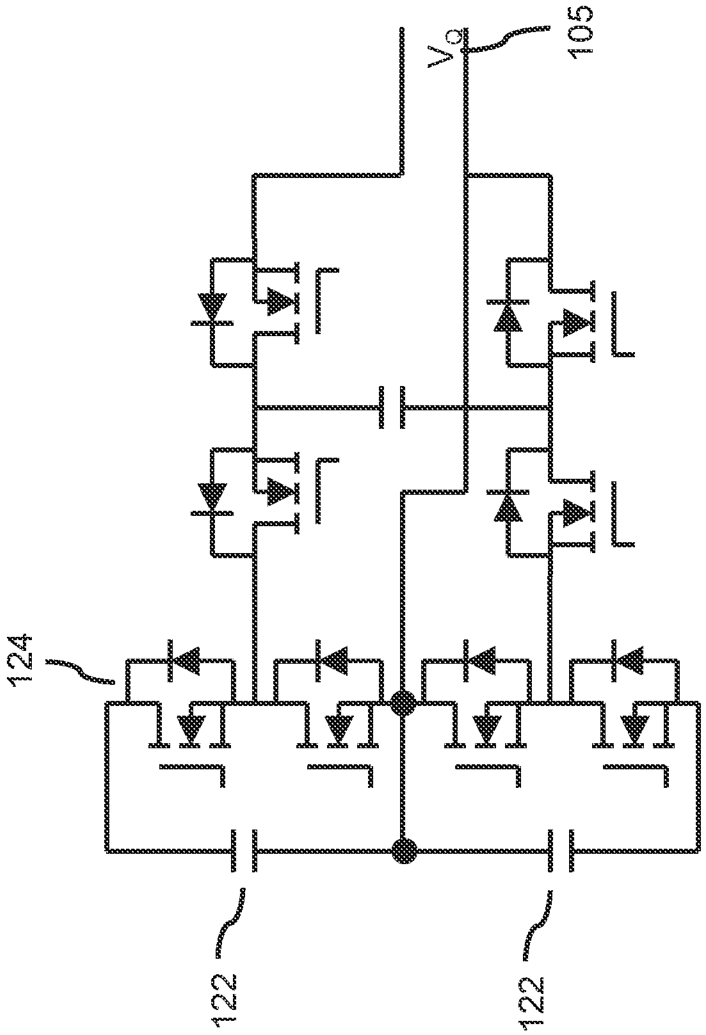
FIG. 2D depicts a schematic circuit diagram of an active compensator where the active compensator is a flying capacitor based five-level converter, in accordance with one or more embodiments of the present disclosure.

Referring now to FIGS. 2A-2D, the active compensator 104 is described, in accordance with one or more embodiments of the present disclosure. FIG. 2A depicts a schematic circuit diagram of the active compensator 104 where the active compensator 104 is a two-level Half-bridge. The active compensator 104 includes two of the wide band-gap transistors in the two-level Half-bridge. FIG. 2B depicts a schematic circuit diagram of the active compensator 104 where the active compensator 104 is a three-level half bridge. The active compensator 104 includes six of the wide band-gap transistors in the three-level Half-bridge. FIG. 2C depicts a schematic circuit diagram of the active compensator 104 where the active compensator 104 is a three-level full bridge. The active compensator 104 includes twelve of the wide band-gap transistors in the three-level Full-bridge. FIG. 2D depicts a schematic circuit diagram of the active compensator 104 where the active compensator 104 is a flying capacitor based five-level converter. The active compensator 104 includes eight of the wide band-gap transistors in the flying capacitor based five-level converter.

Figure 3:
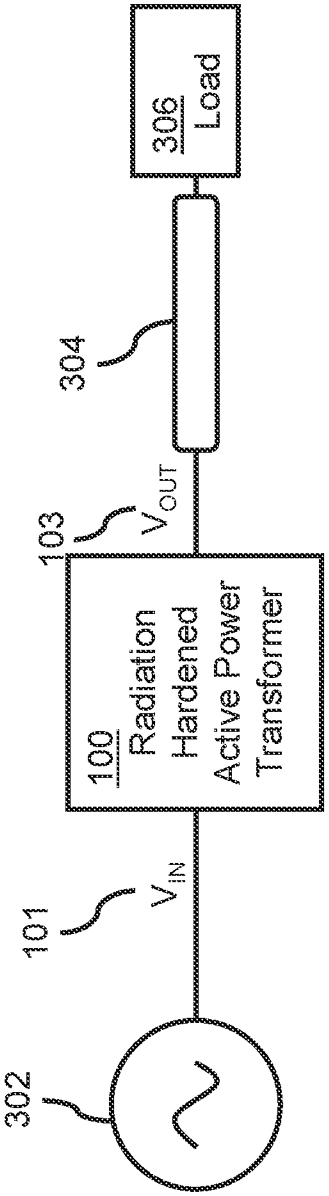
FIG. 3 depicts a simplified block diagram of a power distribution system, in accordance with one or more embodiments of the present disclosure.

Referring now to FIG. 3, a power distribution system 300 is described, in accordance with one or more embodiments of the present disclosure. The power distribution system 300 may be a lunar power distribution system. The power distribution system 300 may include the radiation hardened active power transformer 100, a power generator 302, a transmission line 304, a load 306, and the like.

The power distribution system 300 may include the power generators 302. The power generators 302 may include a nuclear-based electric power generators, or the like. For example, the power generators 302 may include nuclear-based Brayton-cycle generators, nuclear-based Stirling-Cycle generators, or the like. The nuclear-based Brayton-cycle generators and/or nuclear-based Stirling-Cycle generators may include a closed cycle thermal system. In embodiments, the power generator 302 may be a space grade generator designed for working in space environment for longer life and high enough reliability. The power generators 302 may generate the input AC voltage 101. The power generators 302 which are space grade generators may be at a lower voltage spectrum (e.g., in the range of hundreds of Volts). The input AC voltage 101 generated by the power generators 302 may be in the kW to MW range. The power generators 302 may or may not include a capability to handle reactive or harmonic power in the input AC voltage 101 caused by the output AC voltage 103.

The power distribution system 300 may include the radiation hardened active power transformer 100. The radiation hardened active power transformer 100 may receive the input AC voltage 101 from the power generators 302 and step up the input AC voltage 101 to the output AC voltage 103.

The power distribution system 300 may include the transmission lines 304. The transmission lines 304 may be coupled to the radiation hardened active power transformer 100. For example, the transmission lines 304 may be coupled to the circuit breaker 106. The transmission lines 304 may receive the output AC voltage 103 from the radiation hardened active power transformer 100. Thus, radiation hardened active power transformer 100 may interface the power generators 302 with the transmission lines 304.

The transmission lines 304 may transmit the output AC voltage 103 along the length of the transmission lines 304. The length of the transmission lines 304 may be a kilometer or more. For example, the length of the transmission lines 304 may be selected to provide a minimum distance between the power generators 302 and the load 306 (e.g., where the power generators 302 are nuclear based). The input AC voltage 101 may be stepped up to the output AC voltage 103 to reduce electrical power losses over the transmission lines 304, especially resistive losses or conductive losses. The radiation hardened active power transformer 100 may step-up the voltage level of the power generators 302 to a higher voltage level for transmission over the transmission lines 304. Controlling the reactive and harmonic component may enable transferring the output AC voltage 103 across the transmission lines 304 while also maintaining the stability of the power generators 302.

The power distribution system 300 may include the load 306. The load 306 may include an additional of the radiation hardened active power transformers 100. The additional of the radiation hardened active power transformers 100 may step down the output AC voltage 103 to a lower AC voltage. The load 306 may include one or more AC motors or the like. In embodiments, the load 306 is a lunar habitat.

The power distribution system 300 may (i) achieve high power density, high efficiency, and high-performance longer distance distribution system with weaker sources or generators, (ii) realization of radiation tolerant system for high voltage AC transmission, (iii) provide higher stability for large load disturbances, (iv) support high reactive, harmonic loads, (v) provide capability toward paralleling multiple of the power generators 302. The power distribution system 300 may support space grade generators to transmit or distribute power over a longer distance. The power generators 302 may be spaced away from the load centers or target mission habitats.

Figure 4A:
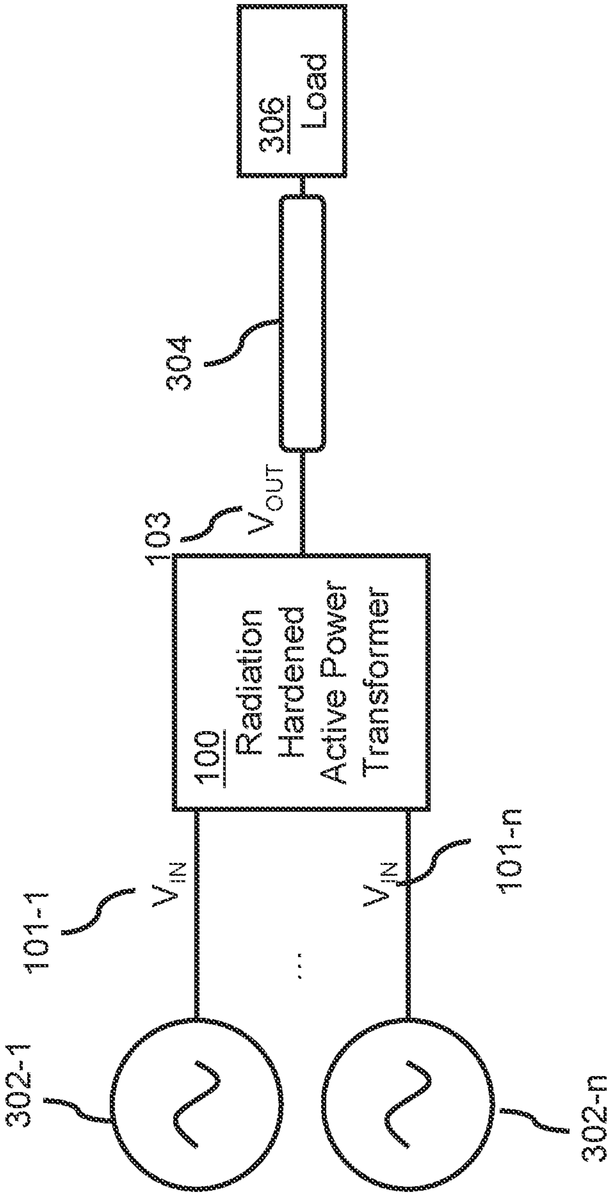
FIG. 4A depicts a simplified block diagram of a power distribution system with multiple power generators connected to a single radiation hardened active power transformer, in accordance with one or more embodiments of the present disclosure.
Figure 4B:
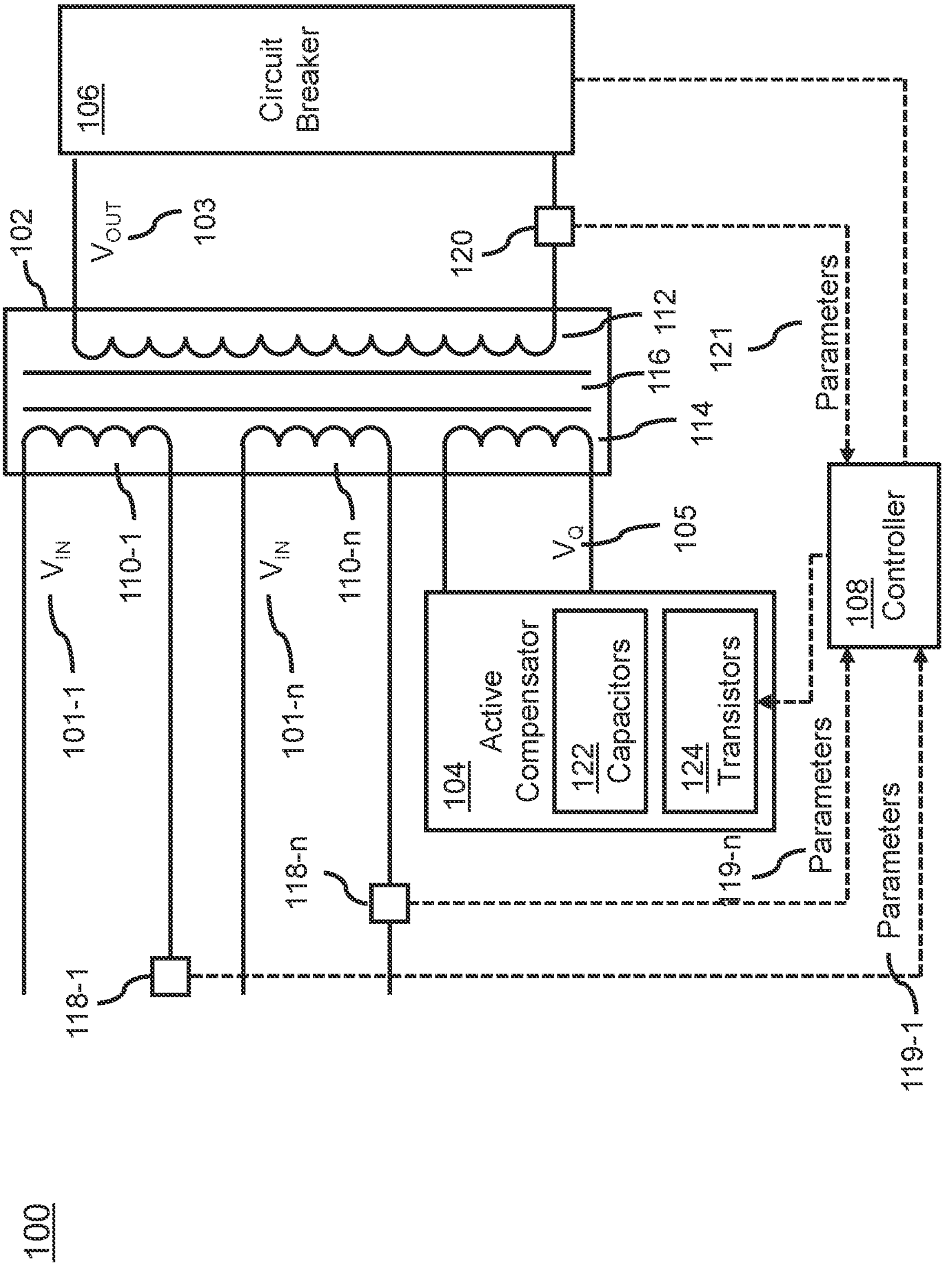
FIG. 4B depicts a radiation hardened active power transformer compatible with stepping up multiple power generators, in accordance with one or more embodiments of the present disclosure.

Referring now to FIGS. 4A-4B, the power distribution system 300 is described, in accordance with one or more embodiments of the present disclosure. The power distribution system 300 may include a plurality of the power generators 302-1 through 118-*n*. The power generators 302-1 through 302-*n* may generate a plurality of the input AC voltages 101-1 through 101-*n*. The power generators 302-1 through 118-*n* may be coupled to the radiation hardened active power transformer 100. The radiation hardened active power transformer 100 may be configured to receive the input AC voltages 101-1 through 101-*n* from the power generators 302-1 through 118-*n*. The radiation hardened active power transformer 100 may be configured to step up the input AC voltages 101-1 through 101-*n* to the output AC voltage 103. For example, the multi-port transformer 102 may include a plurality of the primary windings 110-1 through 110-*n*. The primary windings 110-1 through 110-*n* may receive respective of the input AC voltages 101-1 through 101-*n*. The secondary winding 112 may step up the input AC voltages 101-1 through 101-*n* from the primary windings 110-1 through 110-*n* to the output AC voltage 103. The active compensator 104 may compensate the output AC voltage 103 even where the output AC voltage 103 is stepped up from the input AC voltages 101-1 through 101-*n*. The radiation hardened active power transformer 100 may include a plurality of the primary-side sensors 118-1 through 118-*n*. The primary-side sensors 118-1 through 118-*n* may sense a plurality of the primary-side parameters 119-1 through 119-*n* of the input AC voltages 101-1 through 101-*n*, respectively. The controller 108 may receive the primary-side parameters 119-1 through 119-*n* and control the active compensator 104 based on the primary-side parameters 119-1 through 119-*n* and the secondary-side parameters 121. Thus, the radiation hardened active power transformer 100 may interface one or more of the power generators 302 and input AC voltages 101 to the transmission lines 304 and output AC voltages 103.

Figure 5:
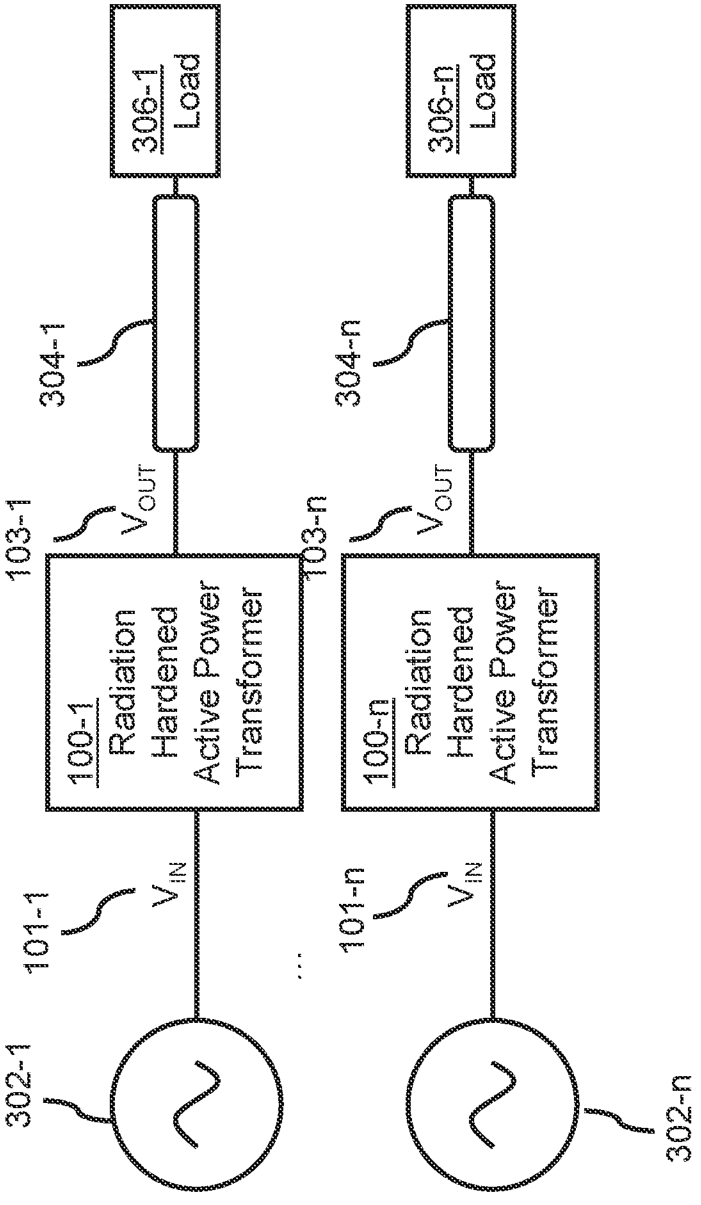
FIG. 5 depicts a simplified block diagram of a power distribution system with multiple power generators connected to multiple radiation hardened active power transformers, in accordance with one or more embodiments of the present disclosure.

Referring now to FIG. 5, the power distribution system 300 is described, in accordance with one or more embodiments of the present disclosure. The power distribution system 300 may include the power generators 302-1 through 118-*n*. The power distribution system 300 may include a plurality of the radiation hardened active power transformers 100-1 through 100-*n*. The power generators 302-1 through 118-*n* may be coupled to respective of the radiation hardened active power transformers 100-1 through 100-*n*. The radiation hardened active power transformer 100-1 through 100-*n* may step up the input AC voltages 101-1 through 101-*n* to a plurality of output AC voltages 103-1 through 103-*n*, respectively. The power distribution system 300 may further include a plurality of the transmission lines 304-1 through 304-*n* and a plurality of loads 306-1 through 306-*n*. The plurality of the transmission lines 304-1 through 304-*n* may connect to the radiation hardened active power transformer 100-1 through 100-*n*, respectively. The plurality of the transmission lines 304-1 through 304-*n* may transmit the output AC voltages 103-1 through 103-*n* to the loads 306-1 through 306-*n*, respectively.

Figure 6:
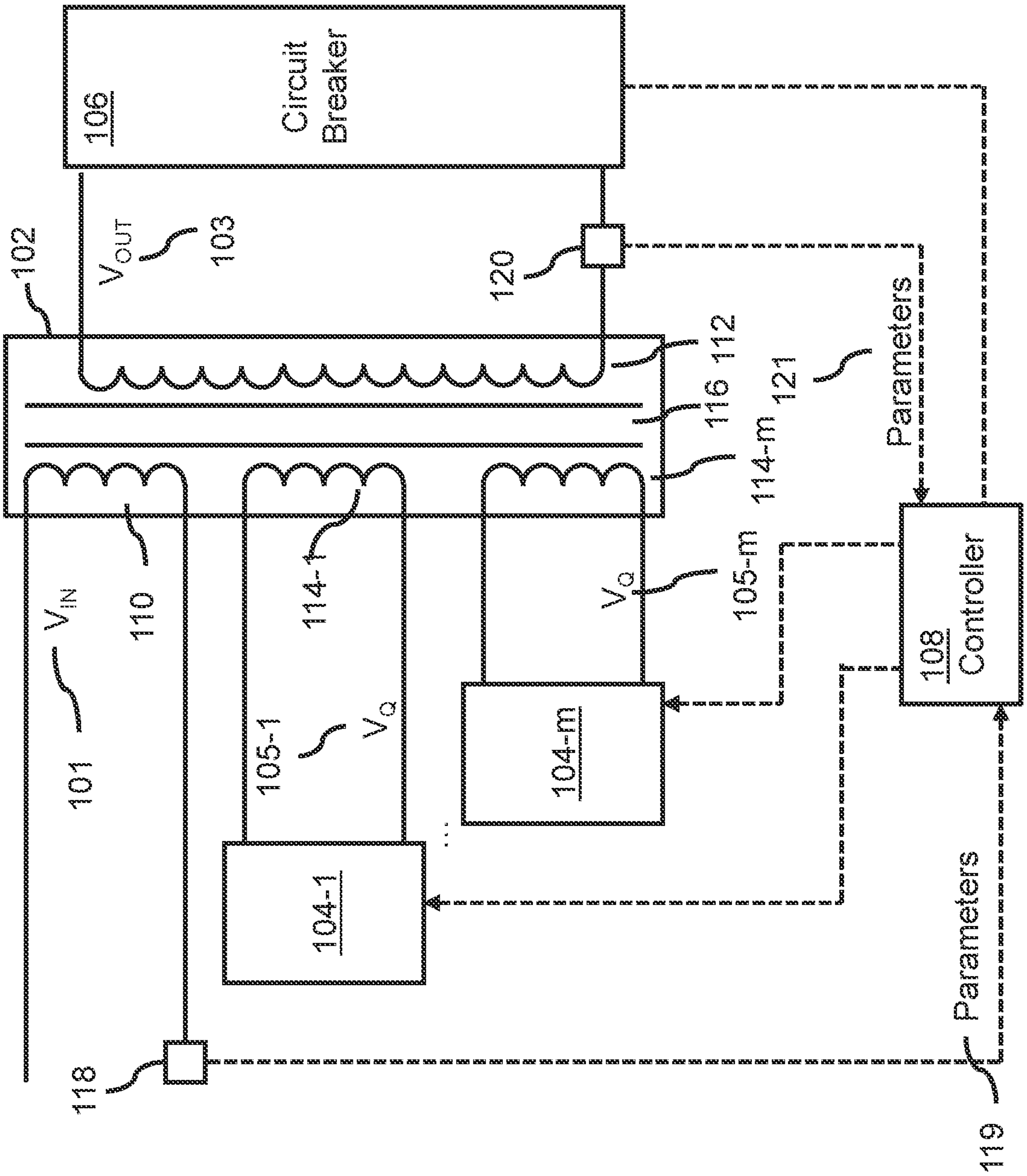
FIG. 6 depicts a radiation hardened active power transformer with multiple active compensators, in accordance with one or more embodiments of the present disclosure.

Referring now to FIG. 6, the radiation hardened active power transformer 100 is described, in accordance with one or more embodiments of the present disclosure. The radiation hardened active power transformer 100 may include a plurality of the active compensators 104-1 through 104-*m*. The multi-port transformer 102 may include a plurality of the tertiary windings 114-1 through 114-*m*. The tertiary windings 114-1 through 114-*m* may be coupled to the active compensators 104-1 through 104-*m*, respectively. The active compensators 104-1 through 104-*m* may control a plurality of reactive AC voltages 105-1 through 105-*m* across the tertiary windings 114-1 through 114-*m*, respectively. It is contemplated that the radiation hardened active power transformer 100 with the active compensators 104-1 through 104-*m* may provide redundancy or fault tolerance should one or more of the active compensators 104-1 through 104-*m* fail.

Although the radiation hardened active power transformer 100 is described as including the active compensators 104-1 through 104-*m* and the multi-port transformer 102 with the tertiary windings 114-1 through 114-*m*, this is not intended as a limitation of the present disclosure. It is contemplated that the radiation hardened active power transformer 100 may include one of the active compensators 104 and the multi-port transformer 102 with one of the tertiary windings 114.

Referring generally again to the figures.

The controller 108 may or may not drive the wide band-gap transistors 124 directly. For example, the radiation hardened active power transformer 100 may include one or more buffers or driver circuitry between the controller 108 and wide band-gap transistors 124.

In embodiments, the radiation hardened active power transformer 100 may include one or more capacitors (not depicted) connected between the multi-port transformer 102 and the circuit breaker 106. The one or more capacitors may be rated for the output AC voltage 103. The one or more capacitors in combination with the active compensators 104 may compensate for reactive power portions of the output AC voltage 103. For example, the one or more capacitors may provide passive compensation of the reactive power portions. However, providing the capacitors which are rated for the output AC voltage 103 may be weight prohibitive for lunar applications.

In embodiments, the radiation hardened active power transformer 100 may include one or more high-voltage active compensators (not depicted). The high-voltage active compensator may be coupled on the secondary-side of the multi-port transformer 102. The high-voltage active compensator may act like a controlled inductor to control the line inductance of the transmission line 304. However, one challenge with the high-voltage active compensator coupled on the secondary-side of the multi-port transformer 102 is radiation hardening the high-voltage active compensator. Additionally, the voltage rating of the capacitors in the high-voltage active compensator may be weight prohibitive. Furthermore, high voltages may be caused across the high-voltage active compensator upon an open fault in the transmission line 304.

It is further contemplated that each of the embodiments of the methods described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the noninclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A radiation hardened active power transformer comprising:

a multi-port transformer comprising a primary winding, a secondary winding, and a tertiary winding; wherein the primary winding receives an input AC voltage; wherein the secondary winding is configured to step up the input AC voltage to an output AC voltage; wherein the tertiary winding is configured to step down the output AC voltage to a reactive AC voltage;

an active compensator comprising a plurality of capacitors and a plurality of wide band-gap transistors; wherein the active compensator is connected to the tertiary winding; wherein the active compensator is configured to control the reactive AC voltage across the tertiary winding using the plurality of wide band-gap transistors;

a controller; wherein the controller is configured to control the plurality of wide band-gap transistors using pulse width modulation; and a circuit breaker coupled to the secondary windings; wherein the circuit breaker is configured to receive the output AC voltage from the secondary winding; wherein the controller is configured to reset the circuit breaker subsequent to the circuit breaker breaking a circuit leading from the secondary winding.

2. The radiation hardened active power transformer of claim 1, the multi-port transformer comprising a core; wherein the primary winding, the secondary winding, and the tertiary winding are wound around the core.

3. The radiation hardened active power transformer of claim 1, wherein the output AC voltage is at least one order of magnitude larger than the input AC voltage; wherein the output AC voltage is at least one order of magnitude larger than the reactive AC voltage.

4. The radiation hardened active power transformer of claim 1, wherein a frequency of the input AC voltage and the output AC voltage is between 60 and 1000 Hz; wherein the controller is configured to control a switching frequency of the plurality of wide band-gap transistors; wherein the switching frequency is at least one order of magnitude higher than the frequency of the input AC voltage.

5. The radiation hardened active power transformer of claim 1, wherein the input AC voltage and the output AC voltage are single-phase; wherein the multi-port transformer is a single-phase transformer.

6. The radiation hardened active power transformer of claim 1, wherein the input AC voltage and the output AC voltage are three-phase; wherein the multi-port transformer is a three-phase transformer.

7. The radiation hardened active power transformer of claim 1, wherein a capacitive voltage of the plurality of capacitors is charged from the reactive AC voltage; wherein the reactive AC voltage does not include real power.

8. The radiation hardened active power transformer of claim 1, wherein a band-gap of the plurality of wide band-gap transistors is between 2 and 4 eV; wherein the plurality of wide band-gap transistors comprise a semiconductor material.

9. The radiation hardened active power transformer of claim 8, wherein the semiconductor material is gallium nitride.

10. The radiation hardened active power transformer of claim 1, wherein the plurality of capacitors are a pair of shunt capacitors which are switched by the plurality of wide band-gap transistors.

11. The radiation hardened active power transformer of claim 10, wherein the active compensator comprises a DC-to-AC converter circuit with the pair of shunt capacitors and the plurality of wide band-gap transistors.

12. The radiation hardened active power transformer of claim 11, wherein the DC-to-AC converter circuit is one of a two-level half bridge, a two-level full bridge, a three-level half bridge, a three-level full bridge, a five-level half-bridge, a five-level full bridge, or flying capacitor based five-level converter.

13. The radiation hardened active power transformer of claim 1, wherein the reactive AC voltage is derated below a maximum operational voltage of the plurality of wide band-gap transistors.

14. The radiation hardened active power transformer of claim 1, comprising one or more primary-side sensors configured to sense one or more primary-side parameters of the input AC voltage; wherein the controller is configured to receive the one or more primary-side parameters and control the plurality of wide band-gap transistors based on the one or more primary-side parameters.

15. The radiation hardened active power transformer of claim 1, comprising one or more secondary-side sensors configured to sense one or more secondary-side parameters of the output AC voltage; wherein the controller is configured to receive the one or more secondary-side parameters and control the plurality of wide band-gap transistors based on the one or more secondary-side parameters.

16. The radiation hardened active power transformer of claim 1, wherein the multi-port transformer comprises a plurality of primary windings configured to receive a plurality of input AC voltages; wherein the secondary winding is configured to step up the plurality of input AC voltages to the output AC voltage.

17. The radiation hardened active power transformer of claim 1, comprising a plurality of active compensators.

18. A power distribution system comprising:

a radiation hardened active power transformer comprising:

a multi-port transformer comprising a primary winding, a secondary winding, and a tertiary winding; wherein the primary winding receives an input AC voltage; wherein the secondary winding is configured to step up the input AC voltage to an output AC voltage; wherein the tertiary winding is configured to step down the output AC voltage to a reactive AC voltage;

an active compensator comprising a plurality of capacitors and a plurality of wide band-gap transistors; wherein the active compensator is connected to the tertiary winding; wherein the active compensator is configured to control the reactive AC voltage across the tertiary winding using the plurality of wide band-gap transistors;

a controller; wherein the controller is configured to control the plurality of wide band-gap transistors using pulse width modulation; and a circuit breaker coupled to the secondary windings; wherein the circuit breaker is configured to receive the output AC voltage from the secondary winding; wherein the controller is configured to reset the circuit breaker subsequent to the circuit breaker breaking a circuit leading from the secondary winding;

a power generator configured to generate the input AC voltage; and a transmission line; wherein the radiation hardened active power transformer interfaces the power generator with the transmission line; wherein the transmission line transmits the output AC voltage.

19. The power distribution system of claim 18, wherein the power generator comprises one of a nuclear-based Brayton-cycle generator or a nuclear-based Stirling-Cycle generator.

* * * * *